United States Patent [19]

Sullivan

[11] Patent Number: 5,035,303
[45] Date of Patent: Jul. 30, 1991

[54] EXCESSIVE WEAR INDICATOR FOR BRAKE SYSTEM

[75] Inventor: James L. Sullivan, Rochester, Mich.

[73] Assignee: Rockwell International Corporation, Pittsburgh, Pa.

[21] Appl. No.: 432,817

[22] Filed: Nov. 7, 1989

[51] Int. Cl.$^5$ ............................................. F16D 66/00
[52] U.S. Cl. ..................................... 188/1.11; 188/72.3
[58] Field of Search ............... 116/205, 208; 188/1.11, 188/72.3; 92/5 R, 5 L

[56] References Cited

U.S. PATENT DOCUMENTS

| | | | |
|---|---|---|---|
| 3,018,852 | 1/1962 | Stanton | 188/1.11 X |
| 3,055,456 | 9/1962 | Pfeiffer | 188/72.3 |
| 3,533,491 | 10/1970 | Svenson | 188/1.11 |

Primary Examiner—Douglas C. Butler

[57] ABSTRACT

An excessive wear indicator for a brake system having a fluid actuated linearly moving piston which is disposed in an opening of a housing and is associated with at least one moveable brake friction element is disclosed. The brake wear indicator comprises a manually actuated, spring biased plunger pin which is slidably disposed in a bore formed in the housing which extends traversely with respect to the direction of movement of the piston. The plunger pin includes a distal feeler end and an actuator end and is disposed in the bore such that the distal feeler end is disposed adjacent a piston wall portion at least when the piston is in its brake actuating position for so long as excessive piston travel associated with excessive brake wear is absent and the actuator end extends outside the housing. Manual manipulation of the actuator end of the plunger pin from outside the housing against the bias of the spring provides an indication of piston travel and excessive brake wear by the feeler end cooperating with the piston wall portion to sense excessive piston travel associated with excessive brake wear.

6 Claims, 3 Drawing Sheets

EXCESSIVE WEAR INDICATOR FOR BRAKE SYSTEM

BACKGROUND OF THE INVENTION

This invention pertains to the art of vehicle brakes, and more specifically to an arrangement which is used to indicate excessive brake lining wear.

Various brake wear indicators are known in the prior art as represented as U.S. Pat. Nos. 3,533,491, 3,983,964, 4,136,634, 4,186,822 and 4,356,897. These known brake wear indicators depend upon visually sensing the amount of brake wear. These systems are cumbersome in that many times the vehicle wheel must be first removed before the brake wear can be determined and often times it is difficult, either due to lighting problems or obstructions, to view these indicators. Also known in the art are brake wear indicators which depend on sound. In these systems, when the brake lining is worn beyond a permissible amount, an audible sound is produced. Most of these systems however require a noise producing element to be imbedded in the brake lining which increases the costs and presents difficulties in manufacturing these liners.

It is extremely difficult, especially in heavy-duty work vehicles, to remove the wheels in order to view the "sight" type indicators and due to the more frequent replacement of brake linings in such vehicles, the additional cost of imbedding a sound producing element in the brake lining itself is not desirable.

The brake systems in many heavy duty work vehicles include various friction plates which rotate in unison with a vehicle wheel, various brake discs which are interposed between the friction plates and which are fixed against rotation relative to the wheel, and a piston, which when activated, engages the brake disc and the friction plates in order to brake the vehicle. This entire system is often located within a housing and therefore would require the disassembling of the housing in order to view the amount of brake wear.

One of the major drawbacks of the prior art brake wear indicator systems is the fact that these systems are not readily accessible to the operator. This is due mainly to the fact that the indicator extends in the direction of movement of the brake discs and piston. The brake disc lining wear indicator disclosed in French Patent Publication No. 2,404,150, issued May 25, 1979, is more readily accessible since the indicator extends perpendicular to the direction of movement of the brake discs and piston. However, due to the location of the indicator, the French system fails to sense the total accumulative wear on the entire brake system. Furthermore, the indicator is located at the frictional surfaces making it susceptible to contamination from the wearing brake linings.

Therefore there is a need for a brake lining wear indicator system which will provide a quick method of checking brake wear without the need to remove the wheels or to imbed special elements in the brake liners, will be easily accessible, will sense the total cumulative wear of the brake system, and which will be located in any area remote from the debris associated with the wearing of the brake linings.

BRIEF SUMMARY OF THE INVENTION

The present invention provides a brake lining wear indicator for use with wet or dry type disc brake assemblies. More particularly, the brake lining wear indicator is particularly adapted for use on a vehicle having a wheel which is steerable through a steering knuckle or hub and with a brake assembly which is actuated by means of an axially moveable brake piston.

As contemplated by the present invention, the brake actuating piston is formed with an axially extending indicator tab remote from the disc brake assemblies and the steering knuckle or hub is formed with a recess which accommodates the tab. The brake lining wear indicator is mounted on the exterior of the steering knuckle or hub and comprises a manually actuated, spring biased plunger pin which is moveable substantially perpendicular to the axial movement direction of the piston against the force of the spring. The plunger pin is aligned with the recess formed in the steering knuckle or hub and includes a distal feeler end.

In order to determine if an excessive brake wear condition exists, the vehicle brakes are first actuated and then the plunger pin is moved towards the recess against the force of the spring. If the distal feeler end of the plunger pin engages the indicator tab, then an excessive brake wear condition is absent. If, on the other hand, an excessive brake wear does exist, actuation of the vehicle brakes will move the piston axially a distance sufficient to move the entire indicator tab from the recess formed in the steering knuckle or hub. If the manually actuated plunger pin is then moved toward the recess, the distal feeler end will no longer engage the indicator tab. This will provide an indication to the operator that an excessive brake wear condition exists.

Mounting of the brake lining wear indicator on the exterior of the steering knuckle or hub and having it moveable perpendicular to the axial movement direction of the brake piston allows the plunger to be quickly and easily accessible to the operator. By sensing the amount of movement of the brake piston, the entire cumulative wear of the brake system is sensed. Also, by locating the indicator in an area remote from the disc brake assemblies, the indicator is less susceptible to contamination from the debris associated with the wearing of the brake lining. Further, by providing a brake lining wear indicator that does not depend on sight or sound but only "touch", the present invention provides a quick method of checking for excessive brake wear without requiring the disassembling of the wheel ends.

These and other objects of the present invention will become more readily apparent by reference to the following detailed description of a preferred embodiment shown in the drawings.

DESCRIPTION OF THE PREFERRED EMBODIMENT

Figure 1:
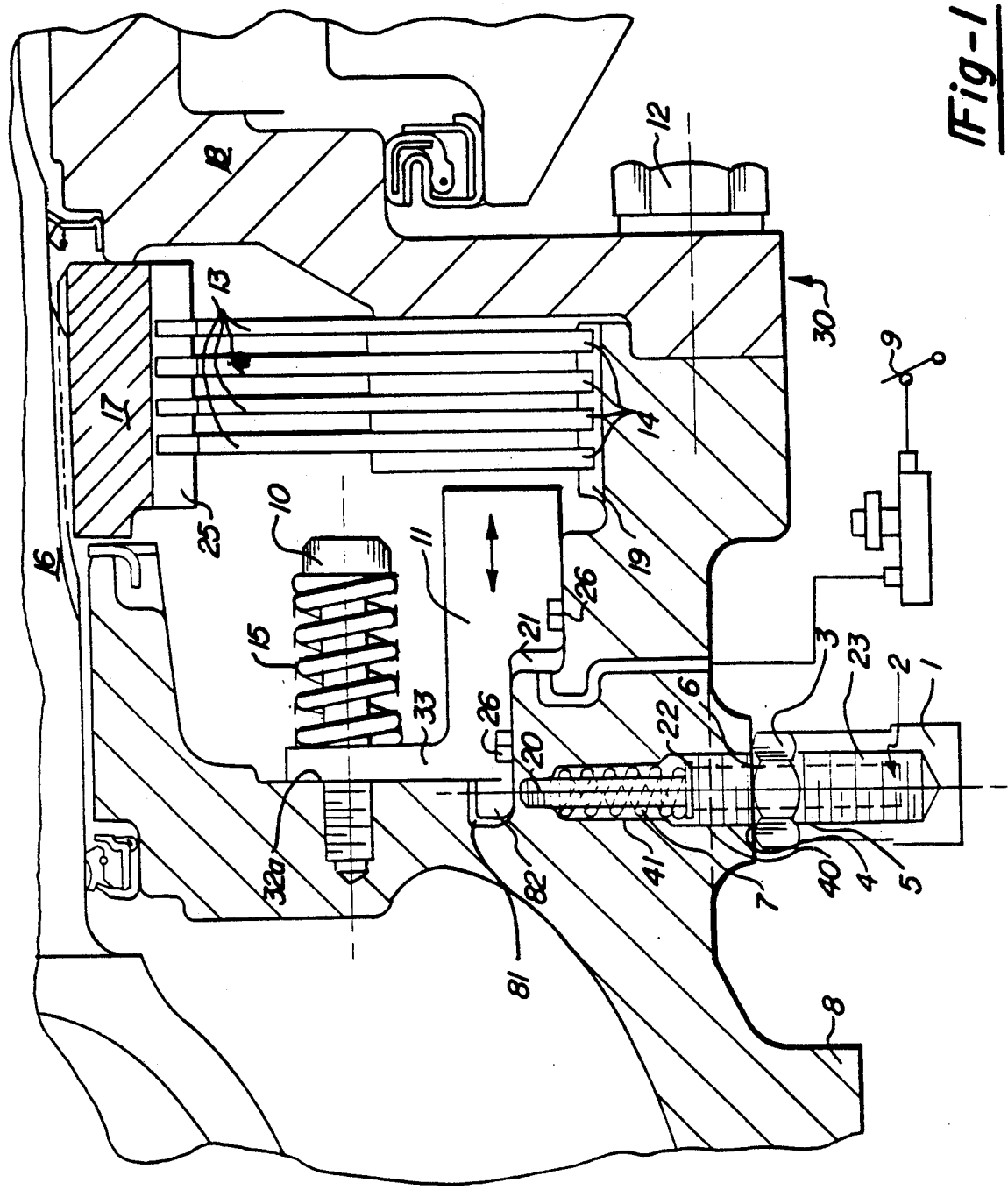
FIG. 1 is a cross-sectional view partially showing a vehicle brake assembly and a brake wear indicator according to the present invention.

As represented in FIG. 1, in accordance with the preferred embodiment, a drive shaft 16 extends from a power source (not shown) located to the left in FIG. 1 to a vehicle wheel (not shown) located to the right of FIG. 1. The drive shaft 16 is rotatably supported upon a spindle 18 as is commonly known in the art. The vehicle wheel would further be rotatably mounted upon the spindle 18.

The spindle 18 forms part of a non-rotating housing 30. The housing further includes a steering knuckle 8 which is used to steer the vehicle wheel in a manner commonly known in the art. The housing may be formed from separate pieces secured together by any fastening means known in the art such as bolts as indicated at 12.

Spline connected to the drive shaft 16 is a coupling 17. The coupling 17 includes another splined portion 25 to which a plurality of friction plates 13 are connected. The spline connections function to rotate the friction plates 13 in unison with the drive shaft 16 but permit axial movement of the friction plates 13 along splined portion 25.

The housing also includes a splined portion 19 to which is connected a plurality of discs 14. The discs 14 are interposed between the friction plates 13 in an alternating fashion. Due to the spline connection between portion 19 and discs 14, the discs 14 are permitted to axially slide relative to the housing 30, yet are fixed against rotation relative to the drive shaft 16.

Located between the frictional plates 13 and the discs 14 are brake linings or friction surfaces. These brake linings may be attached either to the frictional plates 13, the discs 14, or both. It can therefore be seen that axial movement of the friction plates 13 and discs 14 will cause braking of the drive shaft 16. Engagement between the friction plates 13 and the discs 14 is caused by movement of a piston 11. Piston 11 is permitted to slide axially, substantially parallel to drive shaft 16, along various annular guide shafts, one of which is indicated at 10. Springs located within various casings 15 bias the piston 11 to its normal at-rest or non-actuating position. In its normal at-rest position, a rear surface portion 31 of piston 11 engages an annular stop surface 32a of housing 30. Axial movement of piston 11 is caused by regulating the supply of hydraulic fluid pressure in pressure chamber 21 a master cylinder and brake line (not labeled) a conventional vehicle brake pedal 9 under the control of a vehicle operator, a master cylinder and a brake line (shown in FIG. 1). Seals, such as those shown at 26, are provided between steering knuckle 8 and piston 11 to prevent any fluid from escaping pressure chamber 21.

A wall portion 33 of piston 11 is formed with an axially extending indicator tab 82. Housing 30 includes a recess 81 into which indicator tab 82 extends.

The brake wear indicator, generally indicated at 32, and its mounting arrangement will now be described. The housing 30 is formed with a bore which extends substantially perpendicular to the axial direction of movement of piston 11. The bore comprises hole portion 40 and a reduced diameter portion 41. Reduced diameter portion 41 opens into recess 81. The brake wear indicator 32 includes a plunger pin 2 having a reduced diameter portion 20 terminating in a distal feeler end, a central head portion 21, and an actuator portion or proximal end 23. A return spring 7 extends around reduced diameter portion 20. When the plunger pin 2 is inserted into hole portion 40, reduced diameter portion 20 of the plunger extends into the reduced diameter portion 41 of the hole. One end of spring 7 abuts against the surface formed between the hole portions 40 and 41 and its other end abuts against central head portion 21. A hydraulic fitting 3 may then be placed over plunger pin 2 and secured to housing 30 by any suitable means known in the art.

It can therefore be seen that the spring 7 biases the plunger pin 2, by acting on central head portion 21, in a direction away from piston 11. The movement of the plunger pin 2 is limited since the central head portion 21 abuts an end surface portion of hydraulic fitting 3.

In this embodiment, since hydraulic pressure is utilized to move the piston 11, various seals, such as O-rings 4–6, are provided to prevent any fluid leakage. Furthermore, a removable cap 1 may be provided to extend over actuator portion 23 of plunger pin 2. Removable cap 1 will therefore prevent the ingress of debris.

Figure 2:
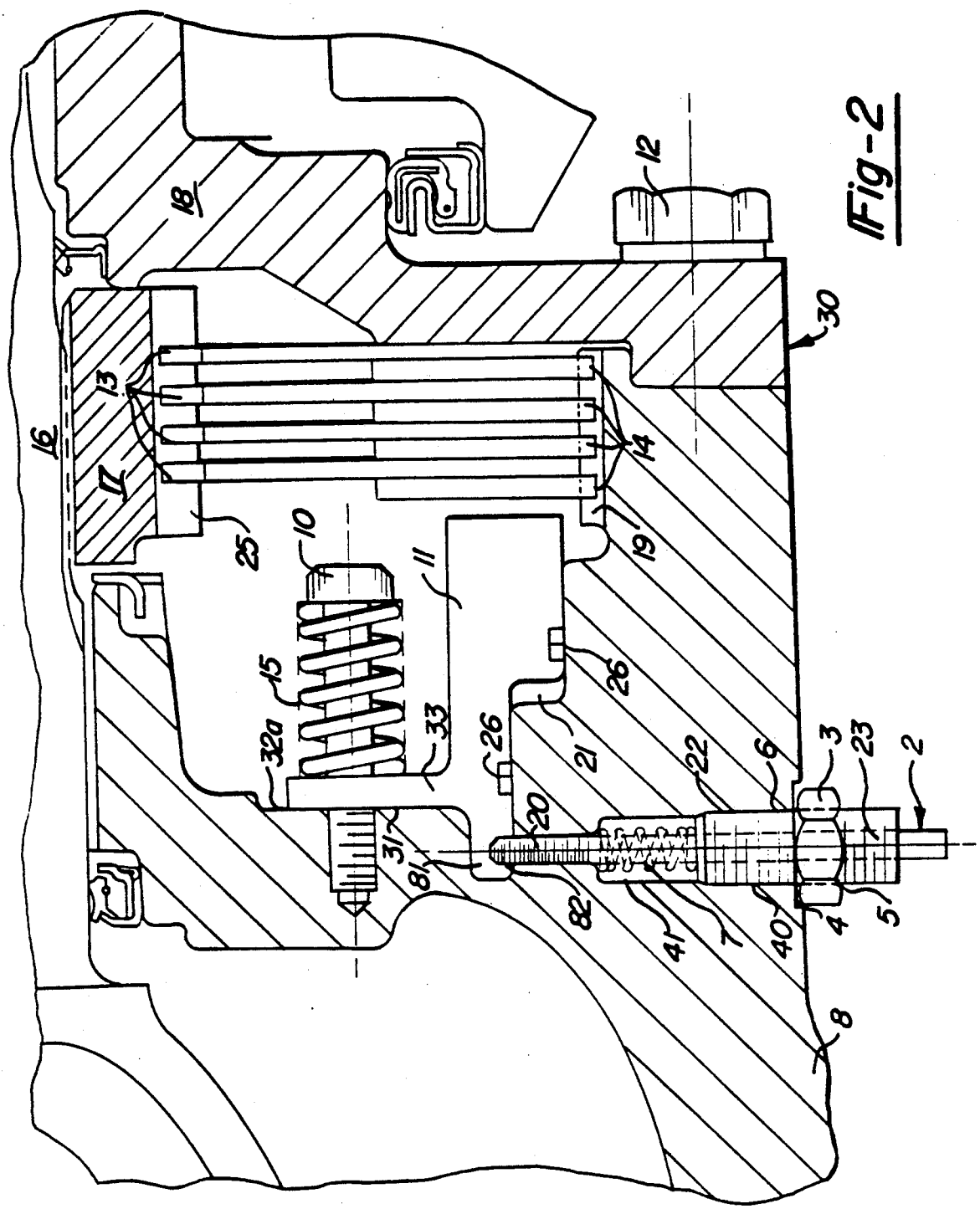
FIG. 2 shows the same cross section as FIG. 1 with the brake actuated and the indicator showing a nonexcessive brake wear condition.

As shown in FIG. 2, when the vehicle brakes are applied the piston 11 moves axially to the right as viewed in the drawings to engage the discs 14 with the friction plates 13. If excessive wear of the brake lining is absent, when the plunger pin 2 is manually compressed against the force of spring 7, the end of reduced diameter portion 20 will abut indicator tab 82 of piston 11.

Figure 3:
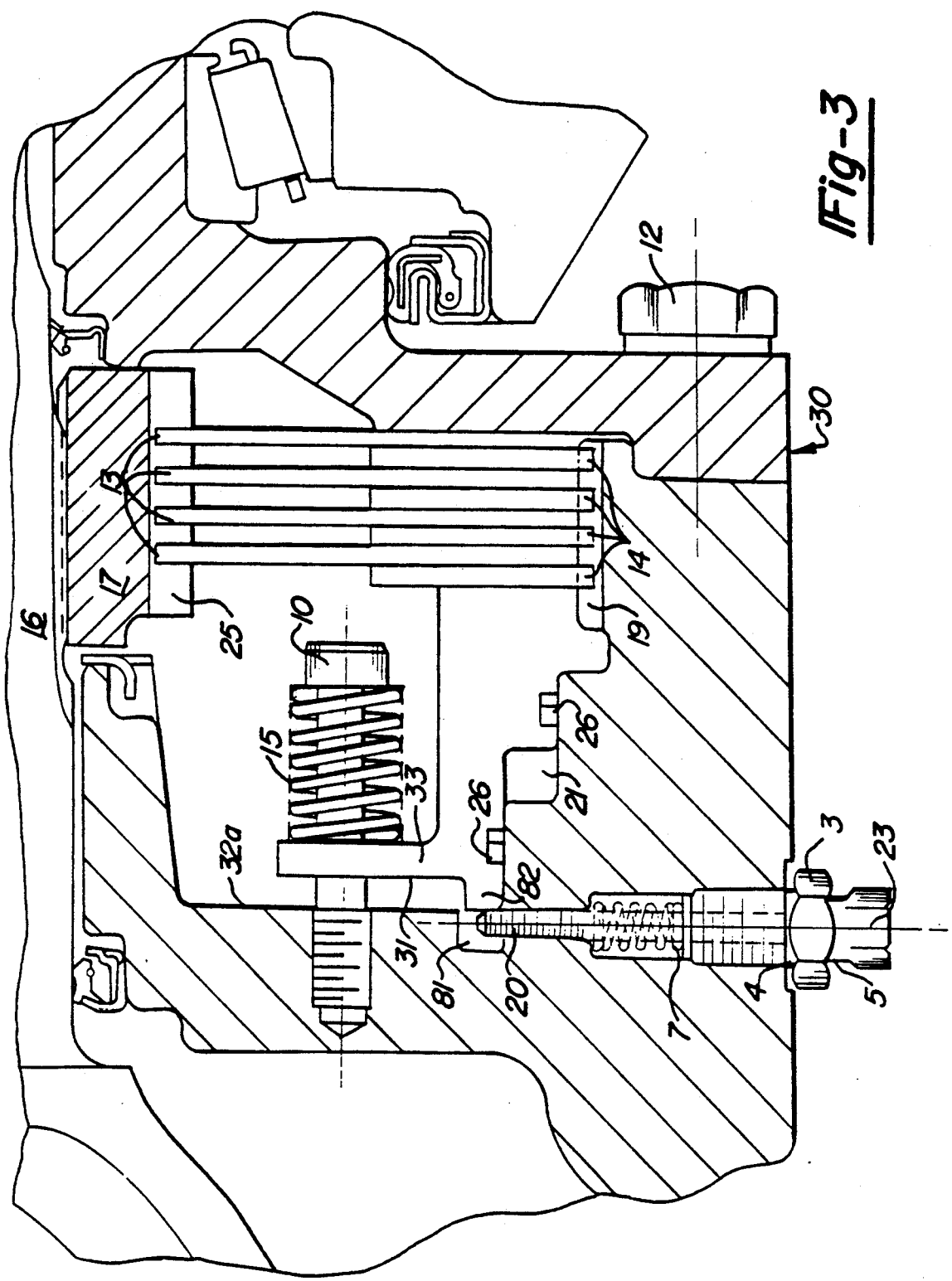
FIG. 3 shows a similar cross section wherein the brake is actuated and an excessive brake wear condition exists.

On the other hand, if upon actuation of the vehicle brakes the piston 11 extends an excessive distance as shown in FIG. 3, the indicator tab 82 no longer extends into recess 81. Upon manually moving plunger pin 2 against the force of spring 7 in this case, the reduced diameter portion 20 of the plunger 2 will not abut indicator tab 82 but will extend into recess 81. At this point, actuator portion 23 of plunger 2 becomes flush with an upper surface of the hydraulic fitting 3 and provides an indication that excessive brake lining wear has occurred.

It can therefore be seen that the wear indicator contemplated by the present invention provides an "all or nothing" brake wear indication. If the reduced diameter portion 20 does not extend into recess 81 upon application of the vehicle brakes and the plunger, then the thickness of the brake linings are still sufficient to provide effective vehicle braking. If on the other hand, upon actuation of the vehicle brakes the plunger 2 may be pushed in flush with the upper surface of the hydraulic fitting 3, then the brake linings need to be replaced.

Various advantages are obtained by the present invention due to the manner in which the brake wear indicator senses an excessive wear condition and the location of the indicator. By locating the indicator in a position remote from the location of the brake discs and plates, the debris due to the wearing of the brake linings is less likely to contaminate the area in which the indicator functions. Also, by sensing the piston displacement, all of the wear associated with the brake system will be accounted for. If some of the various friction brake linings happen to wear more readily than others, the brake wear indicator contemplated by the present invention will account for this wear. Finally, due to the positive stop location of the piston, locating the plunger pin assembly is simplified and involves fewer manufacturing tolerances that must be taken into account. The cost of manufacturing the assembly is therefore reduced.

Although disclosed with respect to a particular wheel brake and housing assembly, it can readily be seen that various changes and/or modifications may be made without departing from the spirit or scope of the invention. In particular, the steering knuckle, drive axle, spindle and brake details could be readily modified and the brake wear indicator could be advantageously used in any vehicle brake system wherein the brake elements are enclosed in a housing without departing from the invention as defined by the following claims.

I claim:

1. An excessive wear indicator for a brake system including a fluid actuated linearly moving piston associated with at least one moveable brake friction element, the piston disposed in an opening in a housing, said piston and opening defining an expansible fluid pressure receiving chamber in communication with a brake fluid supply;

said housing including a stop surface at one end of the opening, said piston being movable between a normal at-rest position at which a surface portion of said piston engages said stop surface and a brake actuating position in which the surface portion of said piston is axially spaced from said stop surface;

a bore in the housing extending transversely with respect to the direction of movement of said piston and being aligned with a piston wall portion, said piston wall portion being located remote from said at least one movable brake friction element at least when said piston is in said normal at-rest position;

a plunger pin means slidably disposed in said bore;

said plunger pin means including a distal feeler end and a proximal actuator end;

spring means for biasing the distal end of the plunger pin means in a direction away from the piston wall portion;

stop means for limiting movement of the plunger pin means away from the piston wall portion;

said plunger pin means disposed so that, when stopped by said stop means, the distal end is adjacent the piston wall portion and the proximal end is outside said housing;

said feeler end of said plunger pin means being disposed adjacent said piston wall portion at least when the piston is in its brake actuating position for so long as excessive piston travel associated with excessive brake wear is absent, said piston wall portion being disposed out of the path of sliding motion of the feeler end of said plunger pin means when the piston travel exceeds a distance associated with excessive brake wear, whereby manipulation of said plunger pin means from outside the housing by moving same against the bias of the spring means provides an indication of piston travel and excessive brake wear by said feeler end cooperating with said piston wall portion to sense excessive piston travel associated with excessive brake wear.

2. An excessive wear indicator as claimed in claim 1 wherein said housing includes an axially extending recess adjacent said stop surface, said piston wall portion including an axially extending tab projecting into said recess at least when the piston is in its brake actuation position for so long as excessive piston travel associated with excessive brake wear is absent, and said feeler end is arranged to cooperate with said tab to sense excessive piston travel associated with excessive brake wear.

3. An excessive wear indicator as claimed in claim 2, wherein said housing comprises a non-rotating, pivotable steering knuckle of a driven and steerable wheel assembly for a vehicle.

4. A brake wear indicator for use in a vehicle having at least one brakeable wheel which is both driven and steerable comprising, in combination:

a housing including a spindle adapted to rotatably support a wheel and a steering knuckle fixed to said spindle and adapted to transmit steering motions to the wheel, said housing further including a recess formed therein;

an axially extending drive shaft rotatably supported by said housing and adapted to transmit driving forces to the wheel;

a brake assembly located within an area between said housing and said drive shaft, said brake assembly including a plurality of axially spaced friction plates arranged to rotate with said drive shaft and to axially slide relative to said drive shaft, a plurality of axially spaced discs interposed between each of said plurality of friction plates in an alternating fashion and arranged to be fixed against rotation relative to said drive shaft and to axially slide relative to said housing, and a piston arranged to cause engagement of said plates and discs when activated, said piston being movable in an axial direction substantially parallel to said drive shaft and including an indicator tab which extends axially into the recess formed in said housing at least when the piston is in its brake actuation position for so long as excessive piston travel associated with excessive brake wear is absent; and a brake wear indicator mounted to said housing and including a manually actuated, spring biased plunger pin movable substantially perpendicular to the axial movement direction of said piston against the force of said spring and which is aligned with said recess, said plunger pin including a distal feeler end and a proximal actuator end;

whereby manipulation of the proximal actuator end of said plunger pin from outside the housing, against the bias of the spring, provides an indication of piston travel and excessive brake wear by said feeler end cooperating with said tab in sense excessive piston travel associated with excessive brake wear.

5. A brake wear indicator as claimed in claim 4 wherein said piston is hydraulically actuated and said plunger pin of said brake wear indicator comprising a push-rod having a reduced diameter portion, a central head portion, and an actuator portion, said spring extending around said reduced diameter portion along a substantial length thereof and functioning between said housing and said central head portion to bias said central head portion into abutting engagement with a hydraulic fitting which mounts said brake wear indicator to said housing.

6. A brake wear indicator as claimed in claim 5 further including a readily removable cap extending over said actuator portion.

* * * * *